Oct. 13, 1970  JIRO NARABU  3,533,242

FENDER ASSEMBLY AND METHOD OF ASSEMBLING IT

Filed Oct. 18, 1968  2 Sheets-Sheet 1

INVENTOR.
JIRO NARABU,
BY
*Linton and Linton*
ATTORNEYS.

United States Patent Office 3,533,242
Patented Oct. 13, 1970

3,533,242
FENDER ASSEMBLY AND METHOD OF ASSEMBLING IT
Jiro Narabu, Tokyo, Japan, assignor to Seibu Gomu Kaguku Kabushiki Kaisha, Tokyo, Japan, a corporation of Japan
Filed Oct. 18, 1968, Ser. No. 768,658
Claims priority, application Japan, Apr. 3, 1968, 43/26,149, 43/26,150
Int. Cl. E02b 3/22
U.S. Cl. 61—48                             4 Claims

ABSTRACT OF THE DISCLOSURE

A fender assembly and the method of assembling it, said fender assembly comprising a pair of resilient solid supports opposite to each other, a wharf engaging surface at one side of each of the supports, an iron plate embedded within each support near its opposite edge, and a fender laid across the tops of said supports and being fastened to said iron plates.

BACKGROUND OF THE INVENTION

The conventional fender as heretofore used has been a single fender piece having a hollow at the core which is fastened to the quay or wharf wall. Being a single piece, such conventional fender when of large size needs a large-size equipment for its manufacture and it is a great inconvenience to carry it to the quay and apply it to the quay wall.

DESCRIPTION OF THE INVENTION

The present invention relates to a fender assembly to be applied to the quay and other objects for the protection of the ship's hull, and to the method of assembling it.

The primary object of this present invention is to provide a fender assembly which comprises a pair of resilient solid supports opposite to each other and having no cavity within themselves, a wharf engaging surface at the base of the supports and an iron plate at the outer surface of the supports and the fender pieces being laid across the top of said suports and fastened to said iron plate. With a recent increasing size of vessels, the fender is required to be larger. The conventional fender, heretofore being a single piece with a hollow in the core, has been found difficult to manufacture on account of the necessity for larger manufacturing facilities and the increased trouble in transportation and installation. According to this present invention, each of the paired solid supports with no cavity can be shaped flat unlike the fender heretofore used and, being solid with no hollow interior, it is easier to manufacture, transport, and install.

The second object of this present invention is to provide a fender with better absorption of impact energy which is in contact with a ship's hull, said fender being fitted on a pair of opposite supports, there being concave surfaces on the opposite sides of said resilient supports which may be of rubber.

The third object of this present invention is to provide a method of constructing a fender assembly, said method comprising the steps of preparing separate supports, attaching them to the wharf or quay wall, and fitting a fender across the opposite outer surfaces of said supports.

The other objects and effects of this present invention will be better understood by referring to the following embodiments of this present invention.

Figure 1:
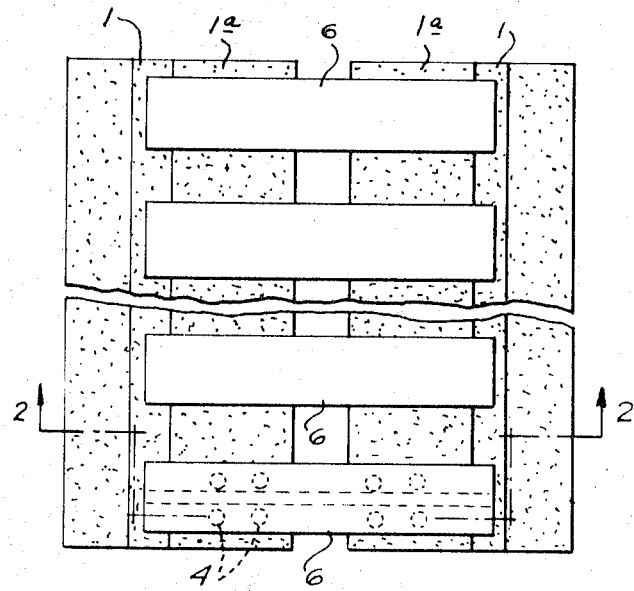
FIG. 1 shows a nelevation seen from the ship's side of the assembly of a first embodiment of this present invention with parts broken away.
Figure 2:
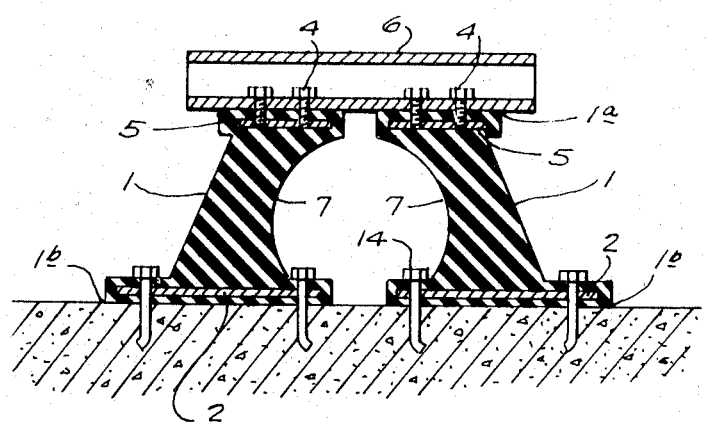
FIG. 2 shows a vertical section along the line II—II of FIG. 1.

To explain the first embodiment with reference to FIGS. 1 and 2, 1, 1 are supports with the outer surface 1a and the wharf engaging surface 1b being parallel to each other, and with an iron plate 2 being embedded near the wharf engaging surface for mounting and an iron plate 5 having bolts 4 being embedded at the outer surface 1a. One side of the support 1 is curved in a concave form as shown at 7. Supports 1 are resilient and may be of rubber.

These two supports 1, 1 are mounted with their concave sides 7 opposite to each other and fastened to the engaging surface of the quay or wharf wall by means of bolts 14. A plurality of fenders 6, 6 which are I-shaped in vertical sections are fastened across the outer surfaces of these supports and they are fastened to said outer surfaces of the supports by means of said bolts 4. Being curved concave on one side, these supports 1 have a cross section thin at the center and growing steadily thicker toward the outer surface and the wharf engaging surface, the outside of the supports being formed flat and the inner sides, i.e., the sides being formed with a curved contour 7 smaller than arcs having a radius equal to $\frac{1}{2}$ of $h$, i.e. the dimension of the support between surfaces 1a and 1b. Of course the concave side of the support need not be a perfectly uniformly curved surface. It can be a curved surface with a larger radius of curvature near the outer side edge of the support and the wharf engaging surface, but generally the inner sides of said supports have the mentioned radius of curvature. The side of the support opposite to this curved side is flat but inclined toward the opposite support 1 in relation to the wharf engaging surface.

Figure 3:
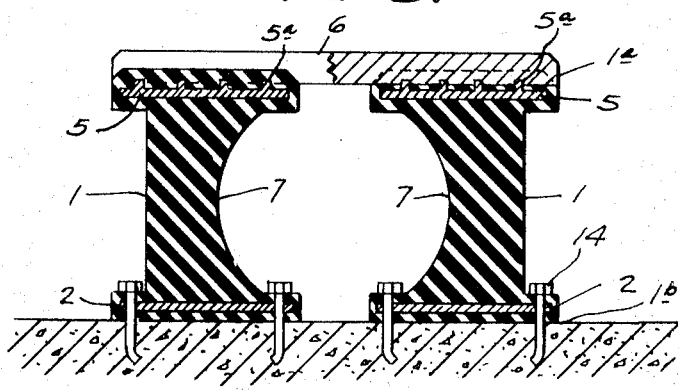
FIG. 3 shows a similar vertical section to FIG. 2 of a second modified embodiment.

In the second modified embodiment illustrated in FIG. 3, the whole assembly is approximately the same as in the first embodiment of FIG. 1 except that the flat outer side of each support is made vertical to the wharf engaging surface. It is desirable that the opposite supports 1 be equally spaced apart at the surfaces 1a and 1b, as indicated in FIG. 3 or that the spacing at the ship's engaging surface be made narrower than at the wharf engaging surface, as indicated in FIG. 1. According to this modified embodiment of FIG. 3, fenders 6 are engaged by projections 5a of the marginal iron plates which are fixed thereto and which are on the opposite side of supports 1.

Figure 4:
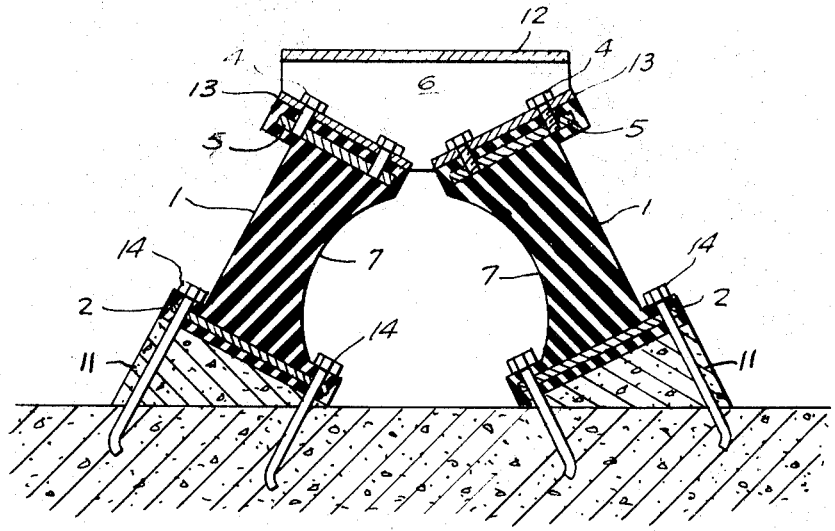
FIG. 4 shows a similar section to FIG. 2 of a third modified embodiment.

In the third modified embodiment shown in FIG. 4, the sectional form of the supports 1 is similar to that in the second embodiment of FIG. 3. However, it is different in the manner of mounting the supports 1 on the quay wall and in the construction of the fenders 6 to be fastened to the outer surfaces of the supports 1.

In this embodiment of FIG. 4, a pair of supports are set with the curved surfaces opposite and fastened to supporting structures 11 tilting inward, which structures 11 are attached to the quay wall.

For the purpose of fastening supports 1 to the structures 11, the bolts 14 buried in the quay wall are passed through a hole provided on the support surface near the wharf and then fastened with a nut. This fastening mode is also used on the other embodiments.

In this embodiment of FIG. 4 as well as in the others, iron plates are buried at the outer surface and in the wharf engaging surface of the support. At the outer surface 1a of the supports of FIG. 4, the fenders 6 are of approximately triangular form having sloping surfaces 13 on the side engaging supports 1, and with the ship side surface 12 parallel to the quay wall and the inclined surfaces 13, 13 of supports 1 opposite to said ship side surface are bolted by bolts 4, 4 on the inclined surfaces 13, 13 of supports 1.

Under applied impact acting not only vertical to the ship side surface of the fender but inclined to it, the fenders 6 in this embodiment of FIG. 4 receive a smaller parallel component of the force and a smaller bending force at the wharf engaging surface, and accordingly the damage to the wharf by such impact can be considerably reduced. Moreover, since the axes of the opposite supports 1, 1 intersect on the side of the ship side surface, the supports can well withstand impact of inclined direction, producing a near normal strain for buckling and thereby, fully absorbing the impact energy.

I claim:

1. In a wharf fender assembly, a pair of similar resilient solid block supports having parallel faces which are adjacent each other provided with concave curvilinear surfaces and the parallel faces of said supports which are remote from each other being flat, mounting means for mounting said supports on the face of a wharf projecting substantially perpendicular therefrom, parallel to each other and adjacent, but spaced apart, a ship engaging fender member, and means attaching said member on surfaces of said supports opposite their wharf engaging surface.

2. In a wharf fender assembly, a pair of similar resilient solid block supports, mounting means for mounting said supports on the face of a wharf and projecting substantially perpendicularly therefrom and parallel to each other and adjacent, but spaced apart, a ship engaging fender member, means attaching said member on surfaces of said supports opposite their wharf engaging surface, and the central axes of said supports extending from their wharf engaging surfaces being inclined at an angle to each other and to said wharf engaging surfaces.

3. In a wharf fender assembly, a pair of similar resilient solid block supports, mounting means for mounting said supports on the face of a wharf projecting substantially perpendicularly therefrom, parallel to each other and adjacent, but spaced apart, a ship engaging fender member, means attaching said member on surfaces of said supports opposite their wharf engaging surface and the central axes of said supports extending from their wharf engaging surfaces being substantially parallel to each other and substantially perpendicular to said wharf engaging surface.

4. In a wharf wall fender assemby, a pair of similar resilient solid block supports, triangular base members attached to the wharf wall and having adjacent inclined faces which project towards each other and to a portion of said wharf wall therebetween, said supports having faces adjacent the wharf wall being attached to said projecting faces of said base members, said supports having their axes being inclined at an angle to each other and to said wharf wall, said supports projecting substantially perpendicular from said wharf wall, parallel to each other and adjacent, but spaced apart, a ship engaging fender member being substantially triangular in form and being attached to end faces of said supports opposite their faces attached to said base members, at mutually inclined faces of said fender member.

References Cited

UNITED STATES PATENTS

| | | | |
|---|---|---|---|
| 2,935,855 | 5/1960 | Reid | 114—219 X |
| 3,418,816 | 12/1968 | Kumazawa | 114—219 X |

J. KARL BELL, Primary Examiner

U.S. Cl. X.R.

114—219